United States Patent
Unterkofler et al.

(10) Patent No.: US 10,620,137 B2
(45) Date of Patent: Apr. 14, 2020

(54) CONTACT LENS INSPECTION SYSTEM

(71) Applicant: Novartis AG, Basel (CH)

(72) Inventors: Sarah Unterkofler, Grosswallstadt (DE); Matthias Schwab, Grosswallstadt (DE)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 16/123,273

(22) Filed: Sep. 6, 2018

(65) Prior Publication Data

US 2019/0072499 A1 Mar. 7, 2019

Related U.S. Application Data

(60) Provisional application No. 62/555,357, filed on Sep. 7, 2017.

(51) Int. Cl.
*G01B 9/00* (2006.01)
*G01N 21/958* (2006.01)
(Continued)

(52) U.S. Cl.
CPC ....... *G01N 21/958* (2013.01); *G01M 11/0257* (2013.01); *G01M 11/0278* (2013.01); *G02B 27/0075* (2013.01); *G06T 7/001* (2013.01); *G06T 7/557* (2017.01); *H04N 5/2256* (2013.01); *H04N 5/22541* (2018.08); *H04N 5/265* (2013.01); *G01N 2021/9583* (2013.01); *G06T 2207/10004* (2013.01); *G06T 2207/10052* (2013.01); *G06T 2207/20212* (2013.01); *G06T 2207/30041* (2013.01)

(58) Field of Classification Search
CPC ......... G01N 21/958; G01N 2021/9583; H04N 5/265; H04N 5/22541; H04N 5/2256; G06T 7/001; G06T 7/557; G06T 2207/10052; G06T 2207/20212; G06T 2207/30041; G06T 2207/10004; G01M 11/0278; G01M 11/0257; G02B 27/0075
See application file for complete search history.

(56) References Cited

U.S. PATENT DOCUMENTS

| 10,380,421 B2 * | 8/2019 | Santos-Villalobos ................. G06K 9/0061 |
| 2008/0291202 A1* | 11/2008 | Minhas ............... G02B 26/0808 345/427 |

(Continued)

FOREIGN PATENT DOCUMENTS

| DE | 102015201823 | 8/2016 |
| EP | 0686842 | 12/1995 |

(Continued)

OTHER PUBLICATIONS

Levoy, R., et al.; "Light Field Photography with Hand-Held Plenoptic Camera", Stanford University Computer Science Tech Report CSTR 2005-02, Apr. 2005.

*Primary Examiner* — Howard D Brown, Jr.
(74) *Attorney, Agent, or Firm* — Patrick M. Ryan

(57) ABSTRACT

A contact lens inspection system, in particular for soft contact lenses, comprises a light source (40) for illuminating a contact lens to be inspected; a plenoptic camera (1) for producing an electronic plenoptic image; a processing unit (103) adapted for electronically processing the electronic plenoptic image of the contact lens and configured for refocusing the image.

1 Claim, 3 Drawing Sheets

(51) Int. Cl.
*H04N 5/225* (2006.01)
*G06T 7/557* (2017.01)
*G06T 7/00* (2017.01)
*H04N 5/265* (2006.01)
*G02B 27/00* (2006.01)
*G01M 11/02* (2006.01)

(56) References Cited

U.S. PATENT DOCUMENTS

| | | | |
|---|---|---|---|
| 2012/0050562 A1* | 3/2012 | Perwass | H04N 5/2254 348/222.1 |
| 2014/0092395 A1* | 4/2014 | Fechner | G01M 11/0207 356/517 |
| 2014/0181630 A1* | 6/2014 | Monney | G06K 9/00201 715/232 |
| 2016/0335474 A1* | 11/2016 | Santos-Villalobos | G06K 9/00604 |

FOREIGN PATENT DOCUMENTS

| | | |
|---|---|---|
| WO | 2003/071222 | 8/2003 |
| WO | 2009/148862 | 9/2009 |
| WO | 2015/053712 | 4/2015 |
| WO | 2015/174927 | 11/2015 |

* cited by examiner

CONTACT LENS INSPECTION SYSTEM

This application claims the benefits under 35 USC 119(e) of U.S. provisional application Ser. No. 62/555,357 filed on Sep. 7, 2017, incorporated herein by reference in its entirety.

BACKGROUND

Field of the Invention

The present invention relates to an inspection method and system for contact lenses. More specifically, the present invention relates the design of a "plenoptic" inspection system, which captures information about the direction distribution of light rays entering the camera of the inspection system.

Background Art

Cameras and vision systems are often used in inspection systems, particularly to inspect for defects. However, conventional camera lenses may not be accurate and or/adequate for inspecting curved surfaces such as contact lens surfaces, because, typically, in an inspection system, the object of the image is projected onto a flat CCD image plane. A technique used to circumvent this problem is to increase the depth of field of the conventional camera lens by reducing the size of the aperture, while accepting the disadvantages connected with reducing the size of the aperture, such as reduced illumination.

In specific applications, such as for example, contact lens inspection, reducing the size of the aperture introduces additional difficulties. The significant curvature of a contact lens (sagittal height of about 3.5 mm and 14 mm diameter) prevents uniform focus across the surface of the lens. Additionally, for items, such as contact lenses, that float in a liquid solution, when the depth of field is adjusted to capture a 3.5 mm depth, the floating debris in solution is also brought into focus, making inspection techniques inaccurate.

The present invention seeks to solve the problems listed herein by providing an inspection system and method to improve the ability to inspect defects on curved surfaces. A particular embodiment includes an optical system that is capable of inspecting defects on the surfaces and sides of contact lenses.

SUMMARY

The present invention suggests an inspection system and a method as it is specified by the features of the independent claim. Advantageous aspects of the device according to the invention are the subject matter of the dependent claims.

Throughout the entire specification, including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value a to "about" numerical value b is disclosed, this is to be understood to include and explicitly disclose a range of numerical value a to numerical value b. Also, whenever features are combined with the term "or", the term "or" is to be understood to also include "and" unless it is evident from the specification that the term "or" must be understood as being exclusive.

The present invention suggests an inspection system and a method for the inspection of a contact lens, in particular a soft contact lens.

In particular, the present invention suggests a contact lens inspection system, in particular for soft contact lenses, comprising a light source for illuminating a contact lens to be inspected; a plenoptic camera for producing an electronic plenoptic image; a processing unit configured for electronically processing and for refocusing the electronic plenoptic image of the contact lens.

In some embodiments of the inspection system according to the invention, the plenoptic camera is adapted for producing a plurality of images, the plenoptic camera having an objective lens, a lenslet array and a photosensors array.

In particular, the lenslet array comprises a plurality of microlenses.

In particular, the camera is arranged on that side of the contact lens opposite to the side where the light source is arranged.

In some further embodiments of the system according to the invention, the processing unit is adapted for processing the different views of the contact lens field received by the photodetector to produce a final image.

In still some further embodiments of the system according to the invention, the processing unit is adapted for producing the final image involving using the different views of the contact lens field to adjust one or more of a plane-of-focus for the final image, a viewing angle for the final image, or a depth-of-field for the final image.

In still some further embodiments of the system according to the invention, producing the final image involves using the different views of the contact lens field to form a final image which has a depth of field arranged along a curved surface of a contact lens to be inspected.

In some other embodiments of the inspection system according to the invention, the photodetector is a Charge-Coupled Device (CCD) array.

Particularly, the processing unit additionally includes a processing mechanism configured to process the different views of the contact lens field received by the photodetector to produce a final image.

In a further variation, while producing the final image, the processing unit is configured to use the different views of the contact lens field to adjust one or more of the following: a plane-of-focus for the final image; a viewing angle for the final image; or a depth-of-field for the final image.

A further aspect of the invention is directed to a method for inspecting a contact lens, in particular a soft contact lens, the method comprising illuminating a contact lens to be inspected, generating an electronic plenoptic image by a plenoptic camera comprising different views of a contact lens field received by a photodetector of the plenoptic camera and electronically processing the electronic plenoptic image of the contact lens by using different views of the contact lens field to adjust a plane-of-focus.

In some further embodiments of the method according to the invention, generating the electronic plenoptic image by the plenoptic camera comprises:

receiving light from a contact lens, particularly on a lens holder, at a lenslet array comprising optical elements and located between the lens and a photodetector of the plenoptic camera, wherein each optical element in the lenslet array receives light from the contact lens field from a different angle than the other optical elements in the lenslet array and directs a different view of the contact lens field onto the photodetector; and receiving light from the lenslet array at a photodetector, wherein the photodetector receives a different view of the contact lens field from each optical element in the lenslet array.

In particular, each different view of the contact lens field is received at a separate location on the photodetector to produce a multidimensional array of different views of the contact lens field at the photodetector.

In some other embodiments of the method according to the invention, the step of receiving light from the contact lens at the lenslet array comprises receiving light from the contact lens by passing through an objective lens.

In some additional embodiments of the method according to the invention, the photodetector is a Charge-Coupled Device (CCD) array.

In some further embodiments of the method according to the invention, the method further comprises processing the different views of the contact lens field received by the photodetector to produce a final image.

In some other embodiments of the method according to the invention, producing the final image involves using the different views of the contact lens field to adjust one or more of the following:
a plane-of-focus for the final image;
a viewing angle for the final image; or
a depth-of-field for the final image.

In some additional embodiments of the method according to the invention, producing the final image involves using the different views of the contact lens field to form a final image which has a plane of focus arranged along the curved surface of the contact lens On the contrary to conventional cameras, which fail to capture a large amount of optical information, the plenoptic camera captures information about the direction distribution of light rays entering the camera. During operation, a conventional digital camera captures a two-dimensional (2D) image representing a total amount of light which strikes each point on a planar photosensor within the camera, whereas the plenoptic image produced by the plenoptic camera contains information about the directional distribution of the light that strikes the photosensor in the plenoptic camera.

Plenoptic image data may be represented or encoded in any of a number of different ways, including (but not limited to) as a 4D image, as a 2D array of 2D disk images such as known in the art, as a 2D array of 2D images of a contact lens taken from different perspectives such as would be captured by an array of cameras, and as any combination of these.

Whichever representation is used, plenoptic image data captured by a plenoptic camera may be processed to produce a 2D image that is suitable for display or output. Such plenoptic processing can include (but is not limited to) generating refocused images of a contact lens, generating perspective views of a contact lens, generating all-in-focus or extended depth of field (EDOF) images, generating perspective views of a contact lens, and/or any combination of these. Additionally, such generated 2D images may be modified or annotated based on the results of analysis of the plenoptic image data performed by algorithms that process the captured plenoptic image data.

Plenoptic image data captured by the plenoptic camera contains information from which the range of depths captured is related to the set of possible 2D images which may be rendered from (or projected from) the captured plenoptic image data. The 2D image may be refocused to a particular scene depth, and the scene depth to which it is refocused may be the same as or different from the scene depth which is optically in focus.

Similarly to a conventional camera, the plenoptic camera generally includes an objective lens which receives light from objects in an object field and directs the received light onto an image plane of the camera. It also includes a photodetector located at the image plane of the camera, which captures the received light to produce an image. However, unlike a conventional camera, the plenoptic camera additionally includes a lenslet array which may be located in front of the objective lens, or particularly between the object field and the objective lens. Each optical element in this lenslet array therefore receives light from the object field from a different angle than the other optical elements in the lenslet array, and consequently directs a different view of the object field into the objective lens. In this way, the photodetector receives a different view of the object field from each optical element in the lenslet array.

The present inspection system and method has the advantage of allowing for a retrospective focus of the electronic plenoptic image taken. This retrospective refocus of the plenoptic image is particularly advantageous for the inspection of contact lenses which have a curved surface. Additionally, this system and method is particularly advantageous when the contact lens is immerged in a liquid in an inspection container. When the contact lens is introduced into the inspection container, the contact lens may be located at a position differing from the rest position in the container (for example the contact lens may be swimming in the liquid it is immerged in), thereby being out of the depth of field of a conventional camera. The electronic plenoptic image may however be refocused on the curved surface for inspection.

Additionally, the electronic plenoptic data retrieved by the plenoptic camera may be used for forming a final image of the contact lens in which final image the focus plane is located along the curved surface, either front surface or the back surface, of the contact lens. In other words, for each point considered along the curved surface of the contact lens, the data is computed so to have a plane of focus at the considered curved surface. The number of points to be computed depends on the accuracy of the final image and of the inherent depth of field of the plenoptic camera system. The higher the depth of field of the camera system, the less points need to be computed from the raw data from the plenoptic image data.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

The afore-mentioned embodiments are practical embodiments of the inspection system for contact lenses, in particular for soft contact lenses.

Further embodiments and advantages become apparent from the following description of detailed embodiments of the inspection system and method for inspecting a contact lens according to the invention with the aid of the drawings.

DETAILED DESCRIPTION OF EMBODIMENTS

Figure 1:
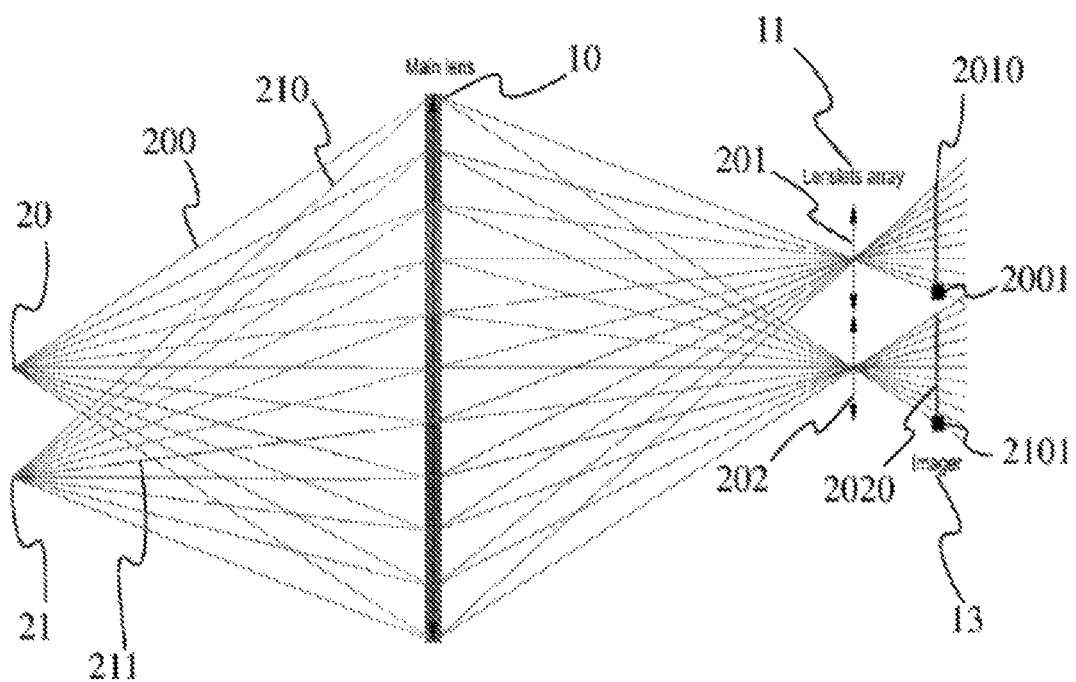
FIG. 1 illustrates in an exemplary embodiment of the light paths in a plenoptic camera.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

In contrast to a conventional camera, a "plenoptic" camera samples the four-dimensional (4D) optical phase space or light field and in doing so captures information about the directional distribution of the light rays. An example of such plenoptic camera is described in, R., Levoy, M., Bredif, M., Duval, G., Horowitz, M. and Hanrahan, P., "Light Field Photography with a Hand-Held Plenoptic Camera," Stanford University Computer Science Tech Report CSTR 2005-02, April 2005. This paper describes plenoptic camera designs based on modifications to a conventional digital camera.

As illustrated on FIG. 1, the lenslet array 11 comprises a plurality of microlenses 201, 202 and a group of photosensors 2010, 2020 of the photodetector 13 is optically associated with each microlens 201, 202 of the lenslet array 11. For example, on FIG. 1, the group of photosensors 2010 is associated with the microlens 201 and the group of photosensors 2020 is associated with the microlens 202. Each group of photosensors associated with a microlens corresponds to a micro-image associated with the corresponding microlens. The number of views of a same point 20, 21 of the contact lens acquired with the plenoptic camera 1 corresponds to the number of photosensors optically associated with one microlens as, thanks to the geometry of the microlens, a same point of the contact lens is viewed according to different angles. This means that each photosensor optically associated with a given microlens acquires data representative of a specific view of a point of the contact lens. The number of views of the contact lens acquired with the plenoptic camera corresponds to the number of pixels associated with each (i.e. under each) microlens of the lenslet array 11. The number of photosensors optically associated with one microlens is advantageously the same for each microlens of the lenslet array 11. As illustrated, the ray of light 200 coming from the acquired contact lens, from the point 20 more specifically, passes through the objective lens 10 of the plenoptic camera 1, and the lenslet array 11 before reaching the photodetector 13, i.e. the photosensor 2001 of the group 2010. In a same way, the rays of light 210, 211 coming from the acquired contact lens, from the point 21 more specifically, passes through the objective lens 10 of the plenoptic camera 1 and the lenslet array 11 before reaching the photodetector 13, i.e. the photosensor 2101 of the group 2020 or a photosensor of the group 2010.

Different views of the contact lens are obtained by demultiplexing and demosaicing the raw image of the contact lens, pixels of the raw image corresponding to the photosensors of the photodetector 13. To obtain a determined view, the pixels of this determined view are collected from the raw image. For example, pixels associated with the photosensors 2001 and 2101 belong to a same view as they are located in a same position relatively to the center of the group of photosensors they each belong to, i.e. the groups 2010 and 2020 respectively.

Figure 2:
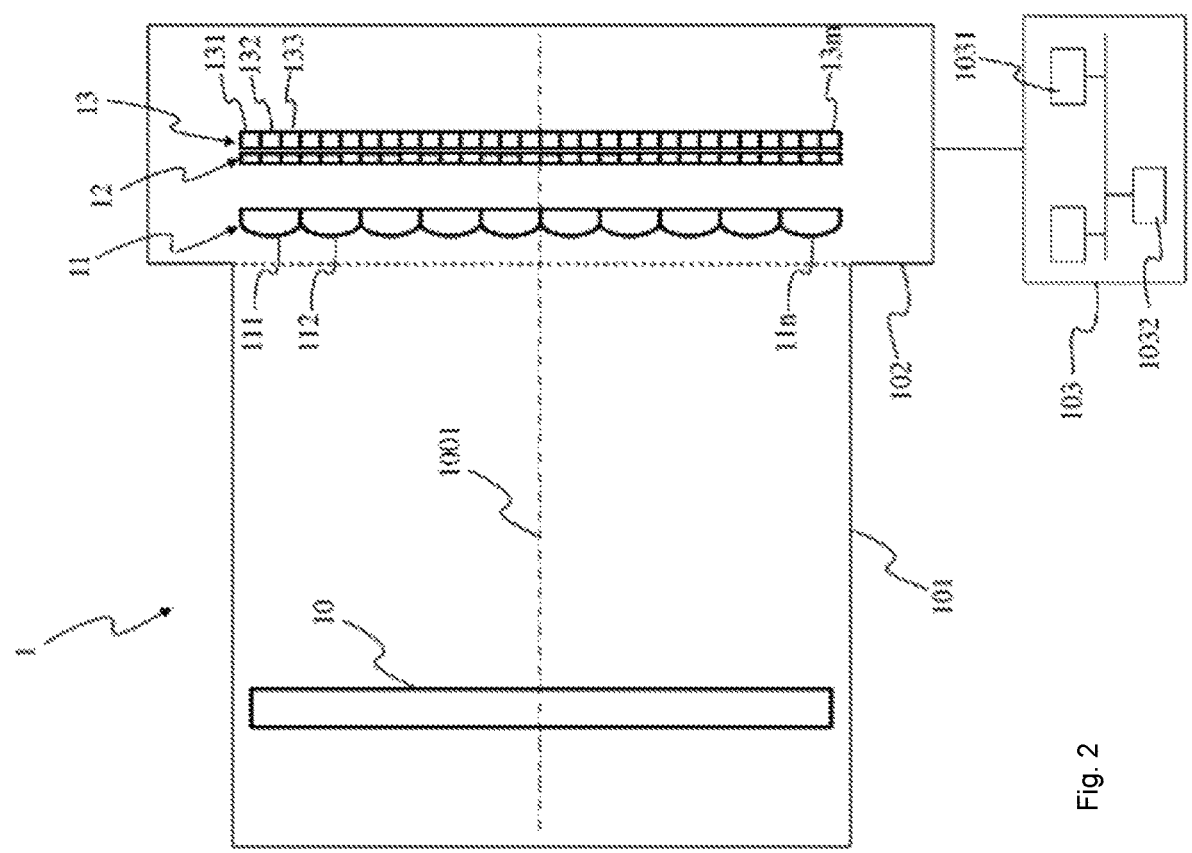
FIG. 2 illustrates a schematic view of a plenoptic camera according to one embodiment of the invention.

FIG. 2 shows a schematic view of a plenoptic camera 1 according to a particular embodiment of the invention. The plenoptic camera comprises a lens unit 101 (corresponding to an optical assembly) and a camera body 102.

The lens unit 101 is advantageously adapted to be associated with the camera body 102. The camera body 102 comprises a photodetector 13, which comprises a plurality m of photosensors 131, 132, 133 to 13m. Each photosensor corresponds to a pixel of the raw image of the contact lens acquired with the photodetector 13, with each pixel encompassing a part (also called a point) of the contact lens. For purposes of illustration, the photodetector 1313 is shown with a relative small number of photosensors 131 to 13m. Naturally, the number of photosensors is not limited by the illustration of FIG. 2 but extends to any number of photosensors, for example several millions of photosensors. For example in a 12.4 megapixel camera, a pixel will correspond to a photosensor. An optional filter array 12 may be arranged on the photosensors array 13.

The camera body 102 also comprises a lenslet array being formed by a microlens array 11 comprising n microlenses 111, 112 to 11n, n being an integer greater than or equal to 2. For purposes of illustration, the microlens array 11 is shown with a relative small number of microlenses, but the number of microlenses may extend up to several million of microlenses. A group of photosensors of the photodetector 13 are optically associated with each microlens 111 to 11n of the microlens array 11. For example, each microlens 111 to 11n of the microlens array 11 is sized to correspond to an array of 2×2, 4×4 or 10×10 photosensors. A group of photosensors associated with a microlens (or said differently, a group of photosensors under the microlens) form a micro-image associated with this microlens, each photosensor of the group of photosensors forming a pixel of the micro-image. Each photosensor of the plurality of photosensors optically associated with one single microlens enables it to acquire raw data representative of a pixel of the contact lens according to one position (acquisition of as many parallaxes as pixels).

In the present embodiment, the lens unit 101 and the camera body 102 collectively form one single body and are assembled without being detachable. They may, however, be designed differently.

The lens unit 101 comprises a camera lens, the objective lens 10, which is formed of one or more lens elements, only one lens element 10 being depicted in FIG. 2 for clarity purpose. The light coming from the contact lens to be acquired with the plenoptic camera and entering the plenoptic camera crosses through the objective lens 10, subsequently through the microlens array 11 and then hitting the photodetector 13.

The plenoptic camera 1 particularly comprises a hardware component 103 configured for controlling the plenoptic camera 1 and for electronically processing the electronic plenoptic image of the contact lens and configured for refocusing the image. The component 103 may particularly be configured for detecting a change in one or more parameters of the camera lens 10, for example a change of the focal length of the camera lens and/or a change of the focussing distance occurring when focalizing or zooming. The component 103 may be comprised in the camera body 102 or in the lens unit 101. The component 103 advantageously comprises one or several processors 1031 associated with a memory, for example a Random Access Memory or RAM 1032 comprising one or more registers. The memory stores instructions of one or more processes implementing the method of controlling the plenoptic camera 1. The component 103 can also receive and/or transmit data to and/or from sources remote from the plenoptic camera 1.

According to a variant, the component 103 is not comprised in the plenoptic camera 1 but connected to the plenoptic camera 1 via a wired connection (for example via USB (Universal Serial Bus)) or via a wireless connection (for example via Bluetooth, Wi-Fi). According to this variant, the component 103 comprises a transmitter to exchange data with the plenoptic camera 1.

The array of pictures is captured by photosensors array 13, which is particularly a CCD array, is processed by processing device 103 to produce a final image. By mixing the available images appropriately, processing device 103 can achieve various "plenoptic" effects, such as refocusing an image, reducing noise, adjusting the viewing angle, and adjusting the depth-of-field for the final image. Alternatively, several different views of the array of pictures received at the photosensors 13 may be processed to have acceptable focus for each level of focus of the contact lens. These images may be combined to achieve a final image focused along the curved surface of the contact lens.

Figure 3:
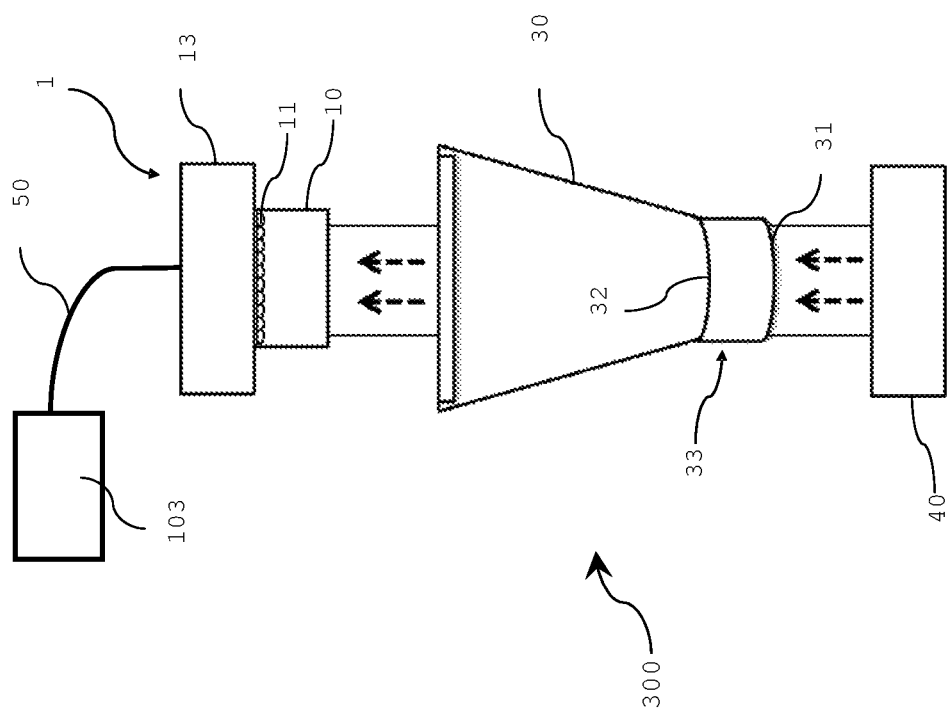
FIG. 3 shows an embodiment of a contact lens inspection system according to the invention.

FIG. 3 shows a schematic view of an embodiment of a contact lens inspection system according to the invention. The contact lens inspection system 300 comprises a light source 40 for illuminating a contact lens, in particular a soft contact lens, which is held in a container 30 (lens holder) in liquid, for example water. The light source 40 is arranged at a first longitudinal end of the container 30 near the container bottom 33, and illuminates the soft contact lens with light. Container bottom 33 is transparent to the light impinging thereon, and in the embodiment has a slightly convex outer surface 31. The soft contact lens may be supported inside the container 30 on a slightly concave inner surface 32 of container bottom 33, this concave inner surface 32 forming a support for the soft contact lens. The other longitudinal end of the container 30 can be either open, or may be provided with a lid which is transparent with respect to the collimated light impinging on the container 30. At that longitudinal end of the container 30 opposite to the end where the light source 40 is arranged, there is arranged a plenoptic camera 1 comprising an objective lens 10, a lenslet array 11 and a photodetector 13, for example a CCD-sensor or CMOS-sensor. The camera 1 is connected via a data line 50 with processing device 103 for processing the array of pictures captured by the photodetector 13 of the camera 1.

For inspecting a contact lens, the contact lens is held in the container 30 and illuminated by the light source 40. An electronic plenoptic image of the illuminated contact lens is then generated by the plenoptic camera 1. The plenoptic image comprises different views of a contact lens field as received by the photodetector due to the lenslet array 11 comprising optical elements located between the objective lens 10 and the photodetector 13 of the plenoptic camera 1. Each optical element in the lenslet array 11 receives light from the contact lens from a different angle than the other optical elements in the lenslet array 11 and directs a different view of the contact lens onto the photodetector 13.

The photodetector 13 receives light from the lenslet array 11. The photodetector 13 receives a different view of the contact lens field from each optical element in the lenslet array 11 and each different view of the contact lens field is received at a separate location on the photodetector 13 to produce a multidimensional array of different views of the contact lens field at the photodetector 13, the electronic plenoptic image.

The electronic plenoptic image of the contact lens is then processed by an electronic processing unit 103 which is configured for refocusing the electronic plenoptic image of the contact lens. In particular, the electronic processing unit 103 is configured to adjust the plane-of-focus for the final image, and/or the viewing angle for the final image and/or the depth-of-field for the final image. Additionally, the electronic plenoptic image data may be processed by the electronic processing unit 103 to produce a final image which has a plane of focus which is arranged along the curved surface—front surface or back surface—of the contact lens by adjusting the focus at each considered point along the curved surface of the contact lens and superposing the computed images to form a final image in which the contact lens surface is sharp.

As mentioned above, the present invention can achieve various "plenoptic" effects, such as refocusing, reducing noise, adjusting the viewing angle, and adjusting the depth-of-field for the image.

The invention claimed is:

1. A method for inspecting a contact lens, the method comprising:
   illuminating a contact lens to be inspected;
   generating an electronic plenoptic image by a plenoptic camera (1) comprising different views of a contact lens field received by the photodetector (13), which is a Charge-Coupled Device (CCD) array; and
   electronically processing the electronic plenoptic image of the contact lens to produce a final image by using different views of the contact lens field to adjust a plane-of-focus;
   wherein generating the electronic plenoptic image by the plenoptic camera (1) comprises
   receiving light from a contact lens, particularly arranged on a lens holder, at a lenslet array (11) comprising optical elements and located between an objective lens (10) and a photodetector (13) of the plenoptic camera, wherein each optical element in the lenslet array (11) receives light from the contact lens field from a different angle than the other optical elements in the lenslet array (11) and directs a different view of the contact lens field onto the photodetector (13); and
   receiving light from the lenslet array (11) at a photodetector (13), wherein the photodetector (13) receives a different view of the contact lens field from each optical element in the lenslet array (11); and
   further wherein the final image has a plane of focus arranged along a curved surface of the contact lens.

* * * * *